United States Patent [19]
Smart et al.

[11] Patent Number: 5,771,400
[45] Date of Patent: Jun. 23, 1998

[54] CAMERA WITH LIGHT-BLOCKING PLUSH TO HOLD FILMSTRIP AGAINST FILM PLATEN

[75] Inventors: David Clinton Smart, Rochester, N.Y.; Tetsufumi Takaba, Hachiohji, Japan; Masaru Yamazaki, Hannoh, Japan; Hiroshi Yamaguchi, Hachiohji, Japan

[73] Assignees: Eastman Kodak Company, Rochester, N.Y.; Konica Corporation, Hino, Japan

[21] Appl. No.: 852,169

[22] Filed: May 6, 1997

Related U.S. Application Data

[63] Continuation of Ser. No. 613,731, Feb. 9, 1996, abandoned.
[51] Int. Cl.$^6$ .................................................. G03B 17/02
[52] U.S. Cl. ................................. 396/6; 396/538
[58] Field of Search .............................. 396/6, 440, 535, 396/538

[56] References Cited

U.S. PATENT DOCUMENTS 5,313,240  5/1994  Lyon et al. ........................... 354/288
5,555,052  9/1996  Pearson ............................. 396/538 X

*Primary Examiner*—Howard Blankenship
*Attorney, Agent, or Firm*—Roger A. Fields

[57] ABSTRACT

A camera comprising a backframe opening for exposing successive frames of a filmstrip, a film platen for supporting each film frame over the backframe opening, a chamber for a film cassette, and a film egress slot located between the backframe opening and the chamber to permit each exposed frame to be moved from the backframe opening into the cassette, is characterized in that a light-blocking resilient material is located at least sufficiently across the slot to prevent light at the backframe opening from shining through the slot to the film cassette and is located adjacent the platen to urge the filmstrip against the platen to hold the filmstrip stationary during exposure of each film frame at the backframe opening.

2 Claims, 2 Drawing Sheets

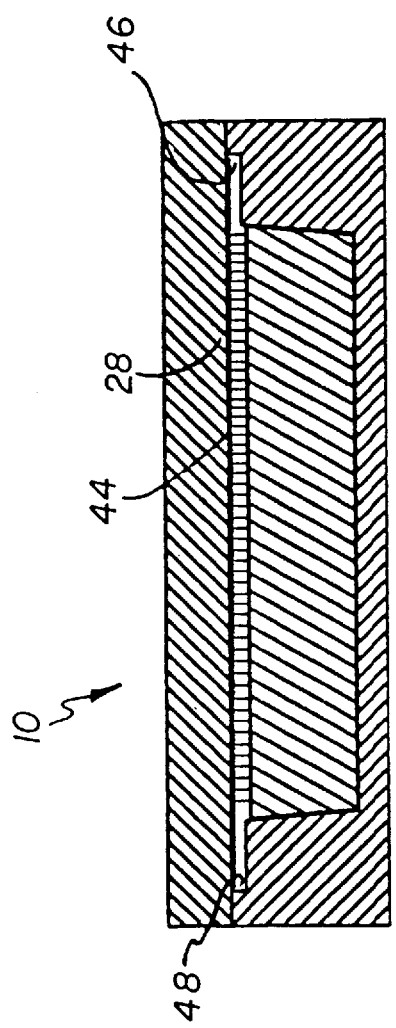

CAMERA WITH LIGHT-BLOCKING PLUSH TO HOLD FILMSTRIP AGAINST FILM PLATEN

This a Continuation of application Ser. No. 08/613,731, filed Feb. 9, 1996, now abandoned.

FIELD OF THE INVENTION

The invention relates generally to the field of photography, and in particular to cameras. More specifically, the invention relates to a camera with light-blocking plush to hold a filmstrip against a film platen to prevent film movement during exposure.

BACKGROUND OF THE INVENTION

It is known for a one-time-use camera to include a backframe opening for exposing successive frames of a filmstrip, a film platen for supporting each film frame over the backframe opening, a chamber for a film cassette, and a film egress slot located between the backframe opening and the chamber to permit each exposed frame to be moved from the backframe opening into the cassette. As shown in prior art U.S. Pat. No. 5,313,240, issued May 17, 1994, a light-tight plush is located in the slot. The presence of the plush may hold the filmstrip away from the platen. Consequently, some film movement may occur during exposure.

SUMMARY OF THE INVENTION

A camera comprising a backframe opening for exposing successive frames of a filmstrip, a film platen for supporting each film frame over the backframe opening, a chamber for a film cassette, and a film egress slot located between the backframe opening and the chamber to permit each exposed frame to be moved from the backframe opening into the cassette, is characterized in that:

a light-blocking resilient material is located at least sufficiently across the slot to prevent light at the backframe opening from shining through the slot to the film cassette and is located adjacent the platen to urge the filmstrip against the platen to hold the filmstrip stationary during exposure of each film frame at the backframe opening.

BRIEF DESCRIPTION OF THE DRAWINGS

FIG. 2 is a cross-section view taken along the line 2—2 in FIG. 1.

DETAILED DESCRIPTION OF THE INVENTION

Figure 1:
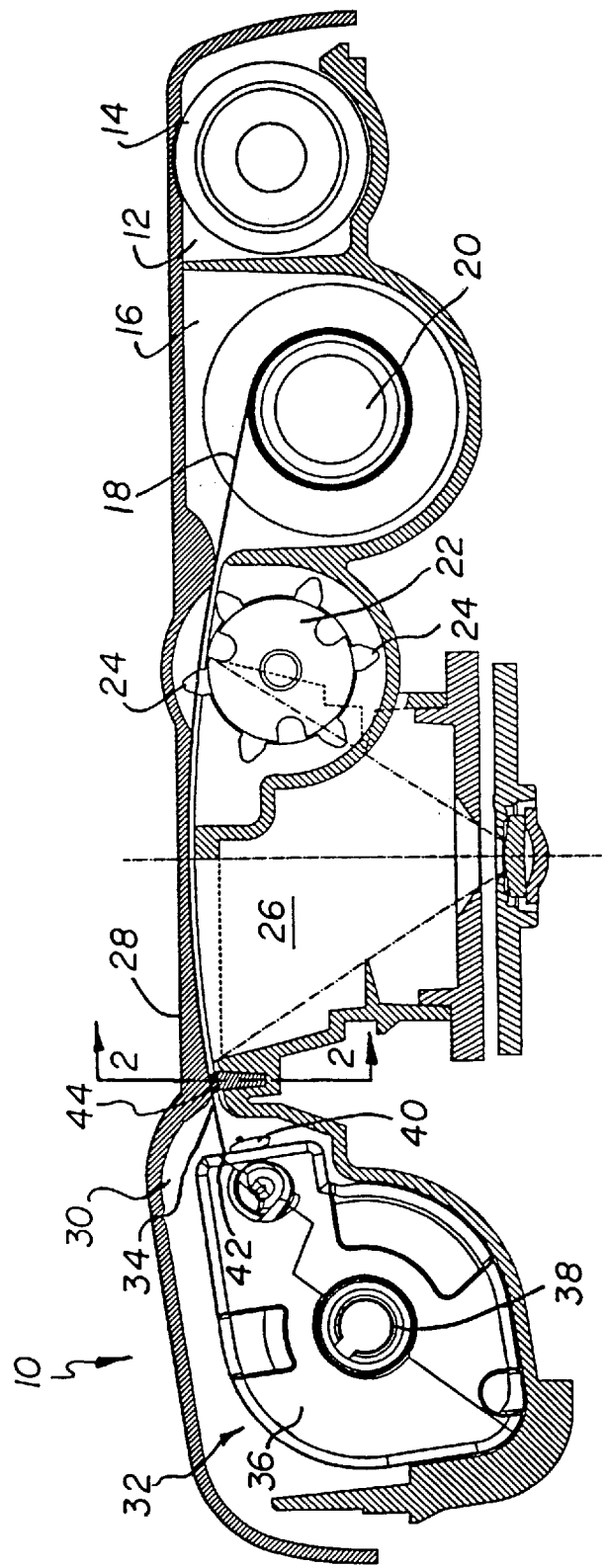
FIG. 1 is a sectioned view of a camera according to a preferred embodiment of the invention.

The invention is disclosed as being embodied preferably in a one-time-use camera. Because the features of a one-time-use camera are generally known, the description which follows is directed in particular only to those elements forming part of or cooperating directly with the disclosed embodiment. It is to be understood, however, that other elements may take various forms known to a person of ordinary skill in the art.

Referring now to the drawings, FIG. 1 shows a one-time-use camera 10 which comprises a chamber 12 containing a flash battery 14, a chamber 16 containing an unexposed filmstrip 18 coiled about a rotatable film supply spool 20, a rotatable film metering sprocket 22 having several peripheral teeth 24 to be received one at a time in respective perforations (not shown) in the filmstrip, a backframe or exposure opening 26 for exposing successive frames of the filmstrip, a fixed film platen 28 for supporting each film frame over the backframe opening, a chamber 30 containing a film cassette 32, and a film egress slot 34 located between the backframe opening and the chamber for the film cassette to permit each exposed frame to be moved from the backframe opening into the film cassette.

The film cassette 32 is similar in operation to ones disclosed in prior art U.S. Pat. No. 5,357,303, issued Oct. 18, 1994, and No. 5,231,438, issued Jul. 27, 1993, and includes a cassette shell 36 that contains a rotatable film take-up spool 38 on which is wound the exposed frames of the filmstrip 18. A light lock 40 is supported open within a film ingress slot 42 in the cassette shell 36 to be pivoted closed after completed film movement into the cassette shell, to make the shell light-tight.

As shown in FIGS. 1 and 2, a light-blocking resilient material 44 such as dense black plush or dense black foam is located sufficiently across the film egress slot 44 to prevent light at the backframe opening 26 from shining through the film egress slot to the open slot 42 in the cassette shell 36 and is located adjacent the film platen 28 to urge the filmstrip 18 against the film platen to hold the filmstrip stationary during exposure of each film frame at the backframe opening. The light-blocking resilient material 44 is slightly spaced from opposite ends 46 and 48 of the film egress slot 44 to not render the slot completely light-tight.

The invention has been described with reference to a preferred embodiment. However, it will be appreciated that variations and modifications can be effected by a person of ordinary skill in the art without departing from the scope of the invention.

PARTS LIST 10. one-time-use camera
12. chamber
14. flash battery
16. chamber
18. filmstrip
20. film supply spool
22. film metering sprocket
24. sprocket teeth
26. backframe opening
28. film platen
30. chamber
32. film cassette
34. film egress slot
36. cassette shell
38. film take-up spool
40. light lock
42. film ingress slot
44. light-blocking material
46. opposite end
48. opposite end

We claim:

1. A camera comprising a backframe opening for exposing successive frames of a filmstrip, a film platen for supporting each film frame over said backframe opening, a chamber for a film cassette, and a film egress slot located between said backframe opening and said chamber to permit each exposed frame to be moved from the backframe opening into the cassette, is characterized in that:

said film platen extends to said slot; and a light-blocking resilient material is located at least sufficiently across said slot to substantially prevent light at said backframe opening from shining through the slot to the film cassette and is located to adjoin said platen in the absence of the filmstrip within the slot and to urge the filmstrip against the platen in the vicinity of the slot when the filmstrip is present in the slot in order to hold the filmstrip stationary during exposure of each film frame at the backframe opening.

2. A camera as recited in claim 1, where said light-blocking resilient material is spaced from opposite ends of said slot to not render the slot completely light-tight.

* * * * *